United States Patent           (10) Patent No.:     US 10,346,949 B1
Raitarovskyi et al.            (45) Date of Patent:         Jul. 9, 2019

(54) IMAGE REGISTRATION

(71) Applicant: Augmented Pixels, Inc., Palo Alto, CA (US)

(72) Inventors: Maksym Raitarovskyi, Odessa (UA); Mykhaylo Norel, Odessa (UA); Vitaliy Goncharuk, Odessa (UA)

(*) Notice: Subject to any disclaimer, the term of this patent is extended or adjusted under 35 U.S.C. 154(b) by 0 days.

(21) Appl. No.: 15/608,338

(22) Filed: May 30, 2017

Related U.S. Application Data

(60) Provisional application No. 62/342,836, filed on May 27, 2016.

(51) Int. Cl.
- *G06K 9/32* (2006.01)
- *G06T 3/00* (2006.01)
- *G06K 9/62* (2006.01)
- *G06T 7/73* (2017.01)
- *G06T 7/35* (2017.01)

(52) U.S. Cl.
CPC .......... *G06T 3/0068* (2013.01); *G06K 9/6202* (2013.01); *G06K 9/6212* (2013.01); *G06T 7/35* (2017.01); *G06T 7/73* (2017.01); *G06T 2207/20072* (2013.01)

(58) Field of Classification Search
CPC ...................... G06T 3/0068; G06T 7/35; G06T 2207/20072; G06T 7/73; G06K 9/6212; G06K 9/6202
USPC ....... 382/128, 151, 174, 190, 197, 201, 253, 382/276, 277, 285, 286, 294
See application file for complete search history.

(56) References Cited

U.S. PATENT DOCUMENTS

| | | | |
|---|---|---|---|
| 7,023,536 B2 | 4/2006 | Zhang et al. |
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,729,515 B2 | 6/2010 | Mandella et al. |

(Continued)

OTHER PUBLICATIONS

Benhimane, et al. "Real-time image-based tracking of planes using Efficient Second-order Minimization", Proceedings of 2004 IEEE/RJS International Conference on Intelligent Robots and System, Sep. 28-Oct. 2, 2004, Sendai, Japan.

(Continued)

*Primary Examiner* — Sheela C Chawan
(74) *Attorney, Agent, or Firm* — Royse Law Firm, PC

(57) ABSTRACT

Systems and methods for computationally efficient and precise transformation recovery using two image frames are provided. A key image frame and a tracked image frame are selected from a series of image frames, a plurality of points on the key image frame are selected, and the plurality of points are then projected onto the tracked image frame to produce a number of corresponding points. Then, for each corresponding point, a patch of pixels is defined centered on the corresponding point. Each pixel of the patch is reprojected back onto the key image frame to identify a reprojected pixel in that image frame. An intensity value for each reprojected pixel is determined and each patch is parameterized. A normal equation for each patch is determined and then solved for the transformation.

13 Claims, 5 Drawing Sheets

(56) References Cited

U.S. PATENT DOCUMENTS

| | | | |
|---|---|---|---|
| 7,826,641 | B2 | 11/2010 | Mandella et al. |
| 7,961,909 | B2 | 6/2011 | Mandella et al. |
| 8,195,005 | B2 | 6/2012 | Huang |
| 8,244,063 | B2 * | 8/2012 | Shechtman ............ G06K 9/64 |
| | | | 382/178 |
| 8,340,357 | B2 * | 12/2012 | Iwasaki ................ G06T 7/215 |
| | | | 345/619 |
| 8,542,219 | B2 | 9/2013 | Carl et al. |
| 8,553,935 | B2 | 10/2013 | Mandella et al. |
| 8,879,813 | B1 * | 11/2014 | Solanki ............... G06T 7/0014 |
| | | | 382/128 |
| 8,897,494 | B2 | 11/2014 | Mandella et al. |
| 8,970,709 | B2 | 3/2015 | Gonzalez-Banos et al. |
| 9,189,856 | B1 | 11/2015 | Gonzalez-Banos et al. |
| 9,229,540 | B2 | 1/2016 | Mandella et al. |
| 9,235,934 | B2 | 1/2016 | Mandella et al. |
| 9,679,227 | B2 * | 6/2017 | Taylor .................... G01C 11/06 |
| 2011/0205340 | A1 | 8/2011 | Garcia et al. |
| 2012/0032978 | A1 | 2/2012 | Chae et al. |
| 2012/0212627 | A1 | 8/2012 | Klose |
| 2014/0037137 | A1 | 2/2014 | Broaddus et al. |
| 2014/0293016 | A1 * | 10/2014 | Benhimane ............ G06T 17/00 |
| | | | 348/50 |
| 2014/0334709 | A1 * | 11/2014 | Siewerdsen ........... G06T 7/0026 |
| | | | 382/132 |
| 2016/0063706 | A1 | 3/2016 | Gonzalez-Banos et al. |
| 2017/0140206 | A1 | 5/2017 | Kazdaghli et al. |

OTHER PUBLICATIONS

Suhr, "Kanade-Lucas-Tomasi (KLT) Feature Tracker", Computer Vision Lab., Computer Vision (EEE6503) Fall 2009, Yonsei Univ.
Civera, et al. "Incorporating Manhattan and Piecewise Planar Priors in RGB Monocular SLAM", Universidad Zaragoza, Instituto de investigación en ingeniería de Aragón.
Eade, et al., "Edge landmarks in molecular SLAM", British Machine Vision Conf. (2006), Journal Image and Vision Computing ,vol. 27 Issue 5, Apr. 2009, pp. 588-596.
Engel, et al., "Semi-dense Visual Odometry for a Monocular Camera", Intl. Conf. on Computer Vision (ICCV) (2013) Open Access version, provided by the Computer Vision Foundation.
<Lein, et al., "Improving the Agility of Keyframe-Based Slam", Active Vision Laboratory, University of Oxford, Uk, European Conference on Computer Vision (Eccv) (2008).

* cited by examiner

IMAGE REGISTRATION

CROSS-REFERENCE TO RELATED APPLICATIONS

This application claims priority to U.S. provisional patent application No. 62/342,836 filed on May 27, 2016 and entitled "Image Registration" which is incorporated herein by reference in its entirety.

BACKGROUND

Field of the Invention

The invention is in the field of digital imaging and more specifically in the field of image registration.

Related Art

Image registration is the process of transforming different sets of data into one coordinate system. Such sets of data may be multiple photographs, data from different sensors, times, depths, or viewpoints. Image registration is used in such fields as computer vision, medical imaging, biological imaging and brain mapping, military automatic target recognition, and compiling and analyzing images and data from satellites. Image registration is necessary in order to be able to compare or integrate data obtained from different measurements. Image alignment algorithms employed for image registration can be classified into two types, intensity-based and feature-based.

The fundamental idea behind feature-based approaches is to split the overall problem—estimating geometric information from images—into two sequential steps. First, a set of feature observations is extracted from the image. Second, the camera position and scene geometry is computed as a function of these feature observations only. This makes an abstraction of the problem which reduces its complexity and allows it to be tackled in real time. However, there are two significant drawbacks with feature-based image alignment algorithms. First, only a small portion of the image information conforming to the respective feature type and parameterization is utilized. Several approaches have been made in the past to remedy this by including edge-based or even region-based features. Yet, since the estimation of the high-dimensional feature space is tedious, they are rarely used in practice. Feature matching also requires the costly computation of scale, and rotation-invariant descriptors and robust outlier estimation methods like RANSAC.

Direct tracking methods are able to overcome the limitations of feature-based methods by optimizing the geometry directly on the image intensities, which enables using all of the information in the image. In addition to higher accuracy and robustness in particular in those environments with few keypoints, these methods provide substantially more information about the geometry of the environment, which can be very valuable for robotics or augmented reality applications. There are two major subcategories of direct methods, dense and semi-dense tracking.

Dense tracking methods take advantage of all the available image information by working directly on the images for both mapping and tracking. The world is modeled as a dense surface at the same time that new frames are tracked using whole-image alignment. These methods increase tracking accuracy and robustness using powerful GPU processors. The same methods can be used in combination with RGB-D cameras (giving the depth for each pixel), or stereo camera rigs to simplify the problem. The task is solved by using each image pixel to recover the full depth map of environment. Gradient iterative methods are used. For each pixel of an image a projection is built, a 2D gradient in the neighborhood of the pixel is measured and the derivatives of 6 degrees of freedom are computed which are proportional to the gradient measurements. Advantages of these methods include good precision and a larger number of initial transforms for iterative minimization start. A semi-dense depth map is a depth map which does not include the depth for every pixel of the stereo pair but only for a subset of the moving pixels.

SUMMARY

The present invention provides systems and methods for computationally efficient and precise transformation recovery using two image frames. As can be seen on real life examples it is common for neighboring pixels to have similar depths. In this way the main idea of the proposed method is to divide an image into several regions called patches that are assigned the same depth value. Resulting patches are then parametrized by gradients and pixel error. A specific set of operations is performed on those regions and a transformation between two image frames is retrieved.

By dividing the image into patches one can achieve the speed of processing comparable with the state of the art gradient methods, for example the Kanade-Lucas-Tomasi (KLT) Feature Tracker (see http://web.yonsei.ac.kr/jksuhr/articles/Kanade-Lucas-Tomasi %20Tracker.pdf) or Efficient Second-order Minimization (ESM) tracking (see http://far.in.tum.de/pub/benhimane2004iros1/benhimane2004iros1.pdf), and comparable to the dense methods robustness and precision.

The present invention is direct to methods, systems capable of performing said methods, and physical memory products storing computer code configured to direct a processor to execute said methods. An exemplary such method is for determining a transformation in SE(3) and comprises a step of selecting a plurality of points on a key image frame, a step of projecting the plurality of points onto a tracked image frame to produce a number of corresponding points on the tracked image frame, and a step of defining, for each corresponding point in the tracked image frame, an array of pixels centered on the corresponding point. The method further comprises a step of, for each corresponding point, reprojecting each pixel of the array thereof back onto the key image frame, wherein the reprojection of each said pixel of the array identifies a reprojected pixel in the key image frame. The method further comprises a step of determining an intensity value for each reprojected pixel, and a step of parameterizing each array of pixels to determine, for each array of pixels, an outer product of the gradient vector for each array of pixels. The method further comprises a step of determining a normal equation for each array of pixels and a step of solving the normal equation for SE(3). In various embodiments, the exemplary method further includes a step of receiving, by a host computing system, a video stream comprising a series of image frames and selecting the key image frame and the tracked image frame from the series of image frames.

In various embodiments, the step of selecting the plurality of points on the key image frame includes selecting the plurality of points according to a grid, while in other embodiments the step includes employing a feature extraction method to select the plurality of points to correspond to features in the key image frame, or assigning random depth values to the points. In various embodiments, the step of selecting the plurality of points further includes mapping depth values from a previous key frame. In still other embodiments the step of selecting the plurality of points on the key image frame further includes extrapolating a depth value for a point from depth values of neighboring points. In various embodiments, the step of projecting the plurality of points onto the tracked image frame includes rigidly transforming each point in SE(3) and then projecting a result onto the tracked image frame using a perspective matrix.

In various embodiments, the step of, for each corresponding point, reprojecting each pixel of the array back onto the key image frame includes finding the positions of the reprojected pixels in the key image frame. In some of these embodiments, reprojecting each pixel of the array back onto the key image frame further includes finding the intensities of the reprojected pixels. Also, in some of the embodiments in which reprojecting each pixel of the array back onto the key image frame includes finding the positions of the reprojected pixels in the key image frame, finding the positions of the reprojected pixels in the key image frame itself includes reprojecting each pixel onto the key image frame using an homography.

In various embodiments, the step of solving the normal equation for SE(3) includes determining a patch intensity difference. In some of these embodiments, the method further includes a step of defining, for each corresponding point in the tracked image frame, a second array of pixels centered on the corresponding point, a step of for each corresponding point, reprojecting each pixel of the second array thereof back onto the key image frame, wherein the reprojection of each said pixel of the array identifies a reprojected pixel in the key image frame, a step of determining a second normal equation for each second array of pixels, and a step of solving the second normal equation for SE(3), wherein an intensity value for each reprojected pixel corresponding to the second array is not determined nor are each second array of pixels parameterized.

DETAILED DESCRIPTION

The present invention improves computation efficiency of image registration by dividing input image frames into specific regions called "patches." Patches are parameterized in some specific way and used in normal equation calculation. A transformation between image frames is recovered by solving the resultant normal equation.

Figure 1:
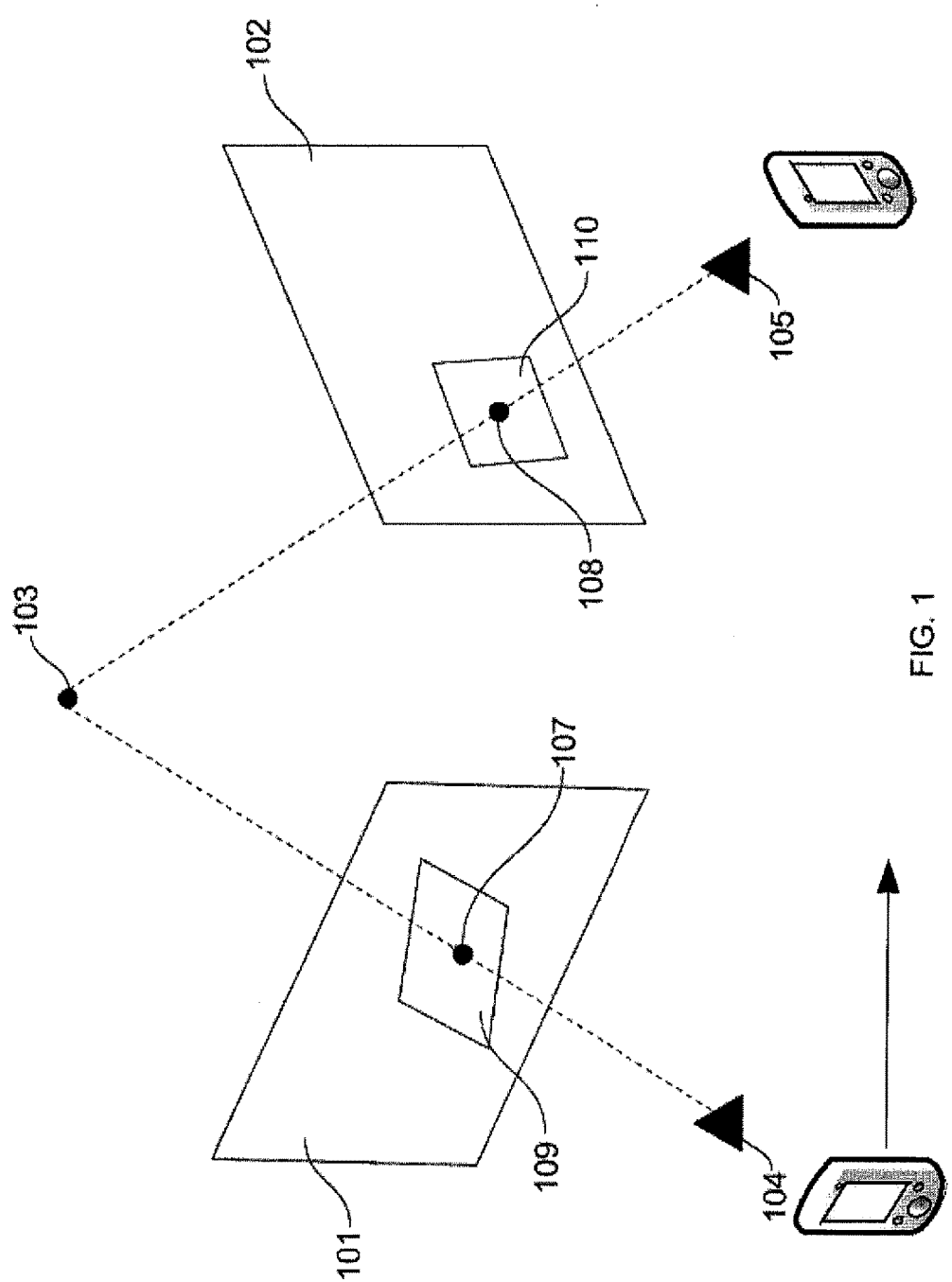
FIG. 1 illustrates an example of two image frames arranged in 3D space.

With reference to FIG. 1, two input image frames are illustrated, a key image frame 101 and a tracked image frame 102. The key image frame is denoted by I_kf while the tracked image frame is denoted by I_tr. The key and tracked image frames 101, 102 can be selected from successive image frames captured from a streaming video, for example, as illustrated by the moving smartphone camera in FIG. 1. The image frames can also come from a medical imaging device while imaging a moving patient, or any other system in which image registration is required. For better results, a tracked image frame 102 should be selected with small transformation and illumination changes relative to the key frame 101. For instance, in a video, a tracked image frame 102 can be an image frame that is in the range of 5 to 15 image frames after the key image frame 101.

In the example illustrated by FIG. 1, a projection of a 3D point 103 is viewed from a position 104 in a first image frame 101 and from a position 105 in a second image frame 102. A patch 110, in this example being a rectangular region, near the projected 3D point 103 on the tracked image frame 102 is built around a projected point 108 where the projected 3D point 103 is located in the tracked image frame 102. Image 101 includes a projected point 107 of the projected 3D point 103 within a warped region 109 that is projected on the key image frame 101 using, for example, an inverse homography transformation (see https://en.wikipedia.org/wiki/Homography_(computer_vision) and US Pre-Grant Publication No. 2012/0212627 A1 by Klose published on Aug. 23, 2012 and US Pre-Grant Publication No. 2012/0032978 A1 by Chae published on Feb. 9, 2012, all of which are incorporated herein by reference) or affine tranformation (see https://en.wikipedia.org/wiki/Affine_transformation and US Pre-Grant Publication No. 2017/0140206 A1 by Kazdaghli et al. published on May 18, 2017, both of which are incorporated herein by reference).

Figure 2:
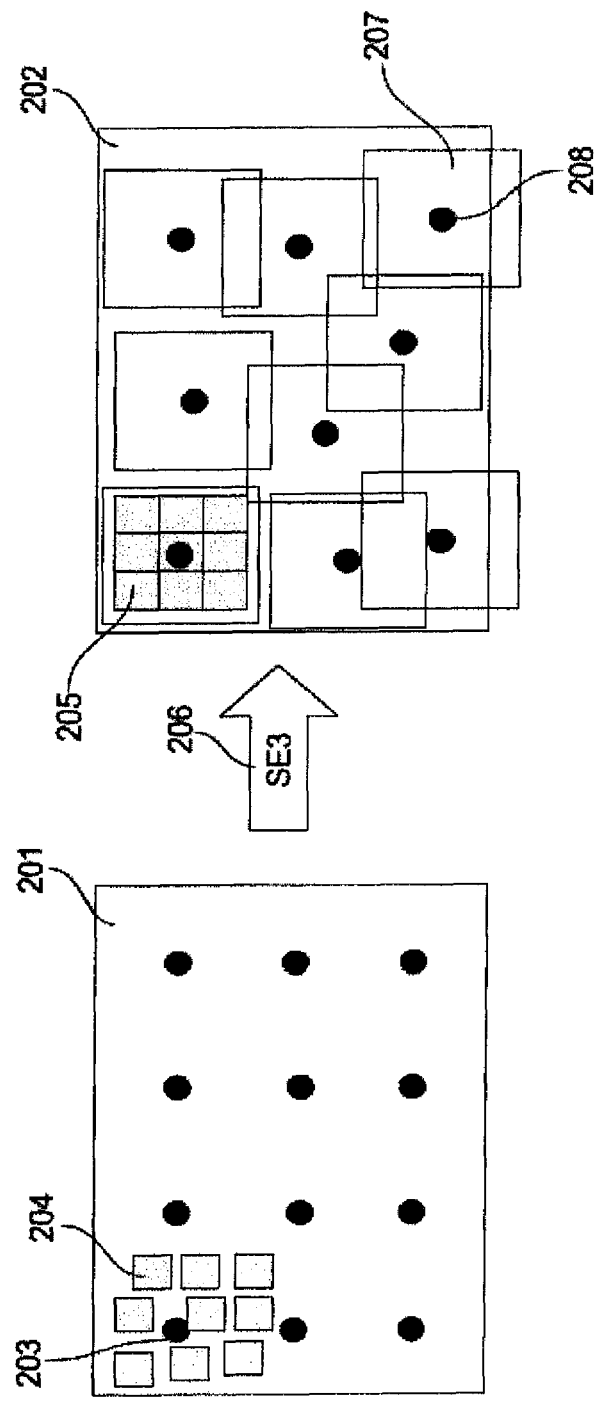
FIG. 2 illustrates a configuration of transformed image regions according to various embodiments of the present invention.
Figure 3:
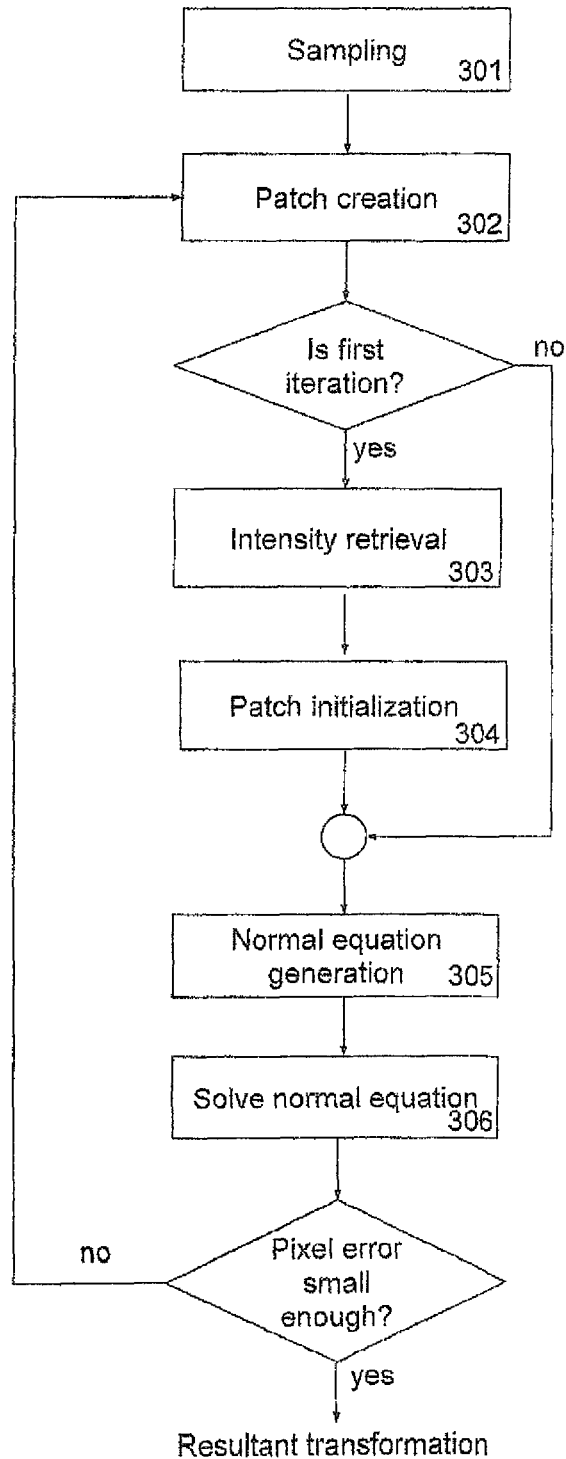
FIG. 3 is a flow chart of an image registration process according to various embodiments of the present invention.

FIG. 2 shows a key image frame 201 and a tracked image frame 202 both capturing a same scene, such as from different perspectives, to illustrate an exemplary method shown in FIG. 3 for recovering a transformation 206 from the two image frames 201 and 202. In the method of FIG. 3, a set of points 203 is selected for the key image frame 201. Points 203 may be selected uniformly or at specific locations using a feature extraction method such as disclosed in U.S. Pat. No. 8,195,005 issued on Jun. 5, 2012 to Huang and which is incorporated herein by reference. Points 203 are then located within the tracked image frame 202 as points 208. If, for example, points 203 were uniformly distributed on the key image frame 201, the corresponding points 208 may not be uniformly distributed on the tracked image frame 202 and may also change their order in vertical and/or horizontal directions depending on the extent of the transformation 206 between key image frame 201 and the tracked image frame 202.

Patches 207 are then defined around the points 208 in the tracked image frame 202. A single patch 207 will include an array of pixels 205, where a 3×3 array is shown for simplicity. A 10×10 array of pixels 205 is exemplary, but any number of pixels will do and the array does not have to be square or rectangular. In the method of FIG. 3, the pixels 205 for each patch 207 are mapped onto pixels 204 of the key image frame 201 using an inverse homography transformation.

The steps of FIG. 3 are directed to building a normal equation for custom parameterization in SE(3). SE(3) is a special Euclidean Group for 3 dimensions which represents a group of rigid transformations in 3D space and that can be represented by linear transformations on homogeneous four-vectors, see for example "Lie Groups for 2D and 3D Transformations" by Ethan Eade (http://ethaneade.com/lie.pdf), incorporated herein by reference. FIG. 3 provides a flowchart of an exemplary method of the present invention.

For simplicity, all pixels are assumed to have the same derivatives for this parameterization. Given a matrix equation $$A*x=b$$

the normal equation is that which minimizes the sum of the square differences between the left and right sides:

$$\mathrm{argmin}(A*x-b).$$

In a step 301 of FIG. 3, points 203 are sampled from the key image frame 201, I_kf in both the horizontal and vertical directions. The result is a plurality of points 203, p_kf within the key image frame 201. Each point 203 can be associated with a depth value, which for example can be some random value, or mapped from the previous key frame, or can be provided from an external source such as Time of Flight camera that provides depth information for each pixel of the image 201, see US Pre-Grant Publication No. 2011/0205340 A1 by Garcia et al. published Aug. 25, 2011 and incorporated herein by reference.

For points 203 that have no direct mapping of depth, a depth can be extrapolated from the depth values of neighboring points 203. This operation is done using the inverse of perspective projection P which is defined by the camera intrinsic parameters and is also known prior. Thus, for each point 203, p_kf the corresponding position in 3D space is x_kf:

$$x\_kf=[\mathrm{inv}(P)*p\_kf,\mathrm{depth}]$$

After the coordinates of the sampling points 203 are located in 3D space in step 301, in a step 302 of FIG. 3 a plurality of patches 207 are defined on the tracked image frame 202. First, a projection on the tracked frame I_tr is made. This is done by rigidly transforming each point x_kf in SE(3) and then projecting the result onto the tracked image frame 202 using a perspective matrix P. The SE(3) transformation for the current iteration is denoted as SE3_i. For the first iteration SE3_i is assigned some prior value. For example this value could be equal to the SE(3) transformation of the previous frame.

$$p\_tr=P*SE3\_i(x\_kf).$$

Then, for each point 208, p_tr, in the tracked image frame 202 an array of pixels 205 called a patch is defined with p_tr as the center of the patch 207. The region defined by the array of pixels 205 of the patch 207 for the point p_tr is represented as R(p_tr).

As shown in FIG. 3, a step 303 is performed on a first iteration of the method, and in this step both the positions and intensities of reprojected pixels 204 on the key image frame 201 are determined. The positions of pixels 204 can be determined by reprojecting each pixel 205 for each patch 207 back onto the key image frame 201. An assumption can be made that each patch 207 is locally planar, thus a homography H can be used. Homography H is calculated from the rigid transformation, SE3_init. The SE3_init transformation may be represented as a rotation R which is a 3×3 matrix and a translation t which is 3×1 vector, where camera intrinsic parameters are denoted as K which is 3×3 matrix and the normal to a patch is denoted as n, which is a 3×1 vector. Then homography H is thus calculated as $$H=K*(R-t*\mathrm{transpose}(n))*\mathrm{inv}(K).$$

Each reprojected pixel 204 is denoted as p_kf' and $$p\_kf'=\mathrm{inv}(H)*p\_tr.$$

The intensity of each reprojected pixel 204 on the key frame 201 is denoted as I_kf(p_kf') which can be the pixel image data at the specific location. An interpolation between several pixels may be used for better accuracy.

In a step 304 a initialization of each patch 207 is performed. Each pixel on patch 207 is parameterized by a gradient Gi and residual err_i.

$$Gi=[gxi\ gyi]$$

where gxi is a pixel gradient in the horizontal direction, gyi pixel gradient in the vertical direction $$gxi=dR(p\_tr)/dx$$

$$gyi=dR(p\_tr)/dy.$$

Err_i is determined as an intensity difference between the pixels 205 and 204:

$$err\_i=I\_tR-R(p\_tr).$$

Each patch 207 is parameterized as the sum of its per-pixel gradient vectors Gi and residuals err_i $$M=[\Sigma gxi \Sigma gyi \Sigma err\_i].$$

The outer product of M is denoted as $M_p$ where $$Mp=M^T*M=$$

$$[\Sigma gxi,\Sigma gyi,\Sigma err\_i]^T*[\Sigma gxi,\Sigma gyi,\Sigma err\_i]=$$

$$[\Sigma gxi*gxi \Sigma gxi*gyi \Sigma gxi*err\_i$$

$$\Sigma gyi*gxi \Sigma gyi*gyi \Sigma gyi*err\_i$$

$$\Sigma err\_i*gxi \Sigma err\_i*gyi \Sigma err\_i*err\_i].$$

The normal equation is then generated in a step 305. The process of calculation is described for each pixel 205 and then for each patch 207. The per pixel normal equation has the form of $$Ji^T*Ji*dx=Ji^T*Ei$$

where Ji is the Jacobian matrix which represents a product of geomteric Jacobian Jg and pixel gradient Gi $$Ji=Jgi*Gi.$$

Geometric Jacobian Jgi may be calculated numerically or analytically as described in "A tutorial on SE(3) transformation parameterizations," Jose-Luis Blanco, Technical report #012010, Grupo de Percepcion y Robotica Dpto. de Ingenieria de Sistemas y Automatica, ETS Ingenieria Informatica, Universidad de Malaga, October, 2014, which is incorporated herein by reference.

The resulting normal equation for each pixel 205 becomes $$Gi^T*Jgi^T*Jgi*Gi*dx=Jgi*Ei.$$

The normal equation for each patch 207 can be found by summing elements of the above equation $$\Sigma Gi^T*\Sigma(Jgi^T*Jgi)*\Sigma Gi*dx=\Sigma Jgi*\Sigma Ei$$

which is $$G^T*\Sigma(Jgi^T*Jgi)*G*dx=\Sigma Jgi*E.$$

The right part of the normal equation is denoted as Hessian matrix H $$H=G^T*\Sigma(Jgi^T*Jgi)*G$$

and the left part of equation, b $$b=\Sigma Jgi*E.$$

After performing matrix multiplication for H and b the left side of the normal equation becomes $$H = \Sigma(gxi*gxi)*Jgi^T*Jgi + \Sigma(gxi*gyi)*Jgi^T*Jgi + \Sigma(gyi*gyi)*Jgi^T*Jgi$$

and the right side of normal equation becomes $$b = \Sigma(gxi*err\_i)*Jg_x + \Sigma(gyi*err\_i)*Jg_y.$$

It can be seen that product sums Σgxi*gxi, Σgxi*gyi, Σgyi*gyi, Σgxi*err_i), (gyi*err_i) are the elements of the patch parameters outer product Mp.

As illustrated in FIG. 3, the outer product Mp is also only calculated during the initialization step 304, which significantly reduces the number of calculations that have to be done at each iteration of the normal equation minimization in the following step.

In a step 306 the normal equation is solved for dx to obtain a new estimation of the delta transformation in SE(3). This equation can be solved, for example, with methods like Gradient Decent, Gauss-Newton, Levenberg-Marquardt and Efficient Second Order Minimization (ESM). In one embodiment, the system performs ESM on the target function. As steps 302, 305, and 306 are repeated in subsequent iterations, the patch intensities difference E converges to a constant value. After some threshold for E is reached the algorithm stops.

Figure 4:
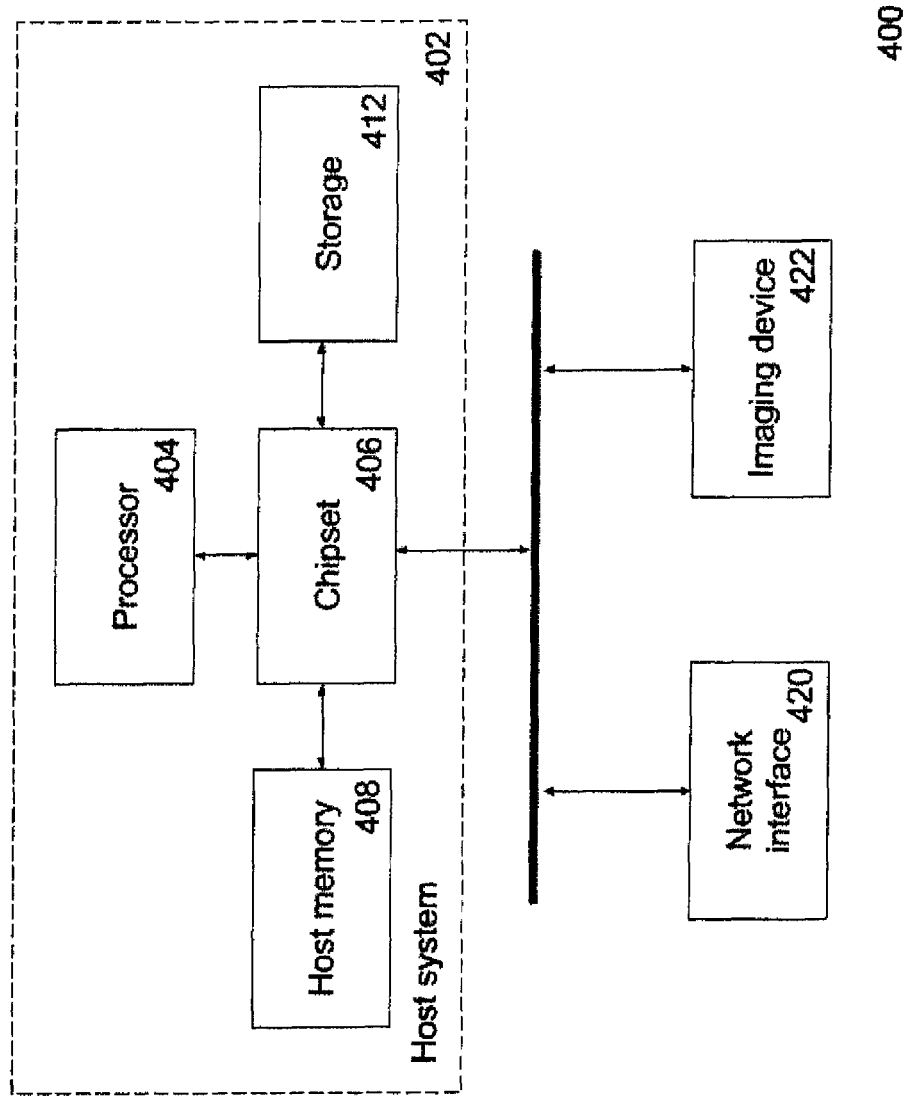
FIG. 4 is a schematic diagram of a hardware system according to various embodiments of the present invention.

FIG. 4 illustrates an exemplary hardware system 400 of the present invention. The system can be, for example, a smartphone such as depicted in FIG. 1. Other systems that can use this invention include wheeled ground robots and unmanned aerial vehicles. The invention may also be used in head mounted displays to robustly track position in 3D. The system 400 comprises a host computing system 402 in communication with a network interface 420 and in further communication with an imaging device 422. The host computing system 402 itself comprises a processor 404, a chipset 406, a host memory 408 and storage 412 in communication with one another and is configured to execute the methods of the invention described above. The network interface 420 can be in communication with a source of depth information, for example.

In use, the host computing system 402 receives video from the imaging device 422 and optionally receives depth data through the network interface 420 and uses both sets of data to create transformations in SE(3).

Figure 5:
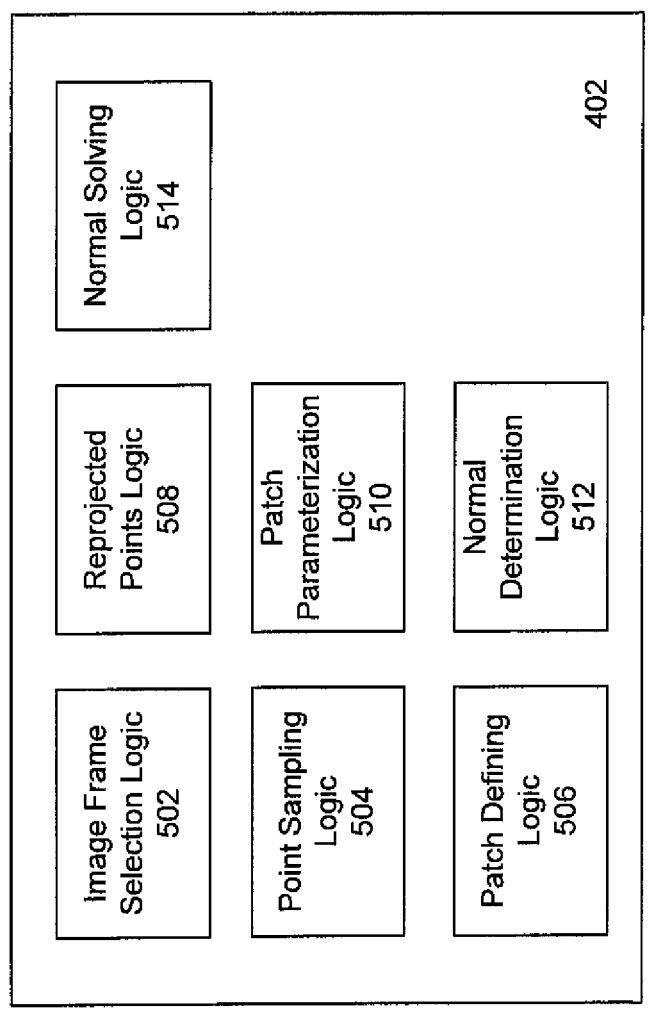
FIG. 5 is a schematic diagram of exemplary logic for performing methods of the invention.

As shown in FIG. 5, the computing system 402 in some embodiments includes image frame selection logic 502. The image frame selection logic is configured to receive a stream of image frames, such as from the imaging device 422, where each image frame includes a pixel array and where each pixel of the array has at least an intensity value. The image frame selection logic is configured to select a key image frame 201 from the stream of image frames and then select a subsequent image frame from the stream of image frames to be a tracked image frame 202. The selection of the key image frame 201 is arbitrary. In some embodiments, selecting the tracked image frame 202 can comprise selecting the $n^{th}$ image frame after the key image frame 201, where n is a constant. In other embodiments, selecting the tracked image frame 202 can comprise monitoring each successive image frame after the key image frame 201 until the transformation and/or illumination changes relative to the key frame 101 meet or exceed a threshold, at which point the image frame is selected, or the prior image frame is selected, as the tracked image frame 202.

The computing system 402 can also include point sampling logic 504 configured to sample points 203 from the key image frame 201 as illustrated by step 301. Point sampling logic is configured to receive the key image frame 201 from the image frame selection logic and further configured to select a plurality of points 203 in the horizontal and vertical directions within the key image frame 201. Point selection logic, in some embodiments, is configured to select points uniformly, such as according to a grid, while in other embodiments point selection logic employ selects points that correspond to features by employing a feature extraction method.

In some embodiments, each point 203 is associated with a depth value provided from an external source, and in these embodiments the pixels of the received image frames of the received stream are received having said depth values already associated therewith. In these embodiments, the point sampling logic is configured to read the depth data for the points 203 from the pixel image data. In other embodiments, the point sampling logic is configured to assign random initial values to the points of the key image frame 201, or configured to map depth values from the previous key frame 201, or configured to extrapolate depth values from the depth values of neighboring points, or combinations of these.

The computing system 402 can also include patch defining logic 506 configured to define a plurality of patches 207 on the tracked image frame 202, as illustrated for example by step 302. Patch defining logic is configured to first make a projection on the tracked image frame 202, for example, by rigidly transforming each point 203 in SE(3) and further configured to then project the result onto the tracked image frame 202 using a perspective matrix P. Then, for each resulting point 208 in the tracked image frame 202, the patch defining logic is configured to define an array of pixels 205 centered on point 208.

The computing system 402 can also include reprojected points logic 508 configured to find the positions and intensities of the pixels 204 in the key frame 201 that correspond to the pixels 205, as illustrated by step 303, for example. Reprojected points logic can be configured to determine the positions of pixels 204, for example, by reprojecting each pixel 205 for each patch 207 back onto the key image frame 201 using an homography H, in some embodiments. Reprojected points logic can be configured to determine the intensities of reprojected pixels 204 by reading the intensities from the pixel image data at the specific pixel locations. In some embodiments, reprojected points logic can be configured to determine the positions of pixels 204 by interpolating between the intensities of several pixels 204 for improved accuracy.

The computing system 402 can also comprise patch parameterization logic 510 configured to parameterize each patch 207, as illustrated by step 304, for example. In various embodiments, patch parameterization logic is configured to parameterize a patch 207 by calculating the gradients in the horizontal and vertical directions, determine a per pixel error as as intensity difference between the pixels 205 and 204, and use these values to determine an outer product of the gradient vector for each patch 207.

The computing system 402 can also comprise normal generation logic 512 configured to determine the normal equation for each pixel 205 and then determine the normal equation for each patch 207.

The computing system 402 can also comprise normal solving logic 514 configured to solve the normal equation for dx to obtain a new estimation of the delta transformation in SE(3). This equation can be solved, for example, with methods like Gradient Decent, Gauss-Newton, Levenberg-Marquardt and Efficient Second Order Minimization (ESM).

Several embodiments are specifically illustrated and/or described herein. However, it will be appreciated that modifications and variations are covered by the above teachings and within the scope of the appended claims without departing from the spirit and intended scope thereof. For example, the teachings herein may be applied to products as well as services.

Computing systems referred to herein can comprise a personal computer, a server, a distributed computing system, a communication device, a network device, or the like, and various combinations of the same. Processors referred to herein can comprise microprocessors, for example. Chipsets referred to herein can comprise one or more integrated circuits, and memories and storage referred to herein can comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. As such, it will be appreciated that the various examples of logic noted above can comprise hardware, firmware, or software stored on a computer-readable medium, or combinations thereof. A computer-readable medium, as used herein, refers only to non-transitory media, does not encompass transitory forms of signal transmission, and expressly excludes paper. Computer-implemented steps of the methods noted herein can comprise a set of instructions stored on a computer-readable medium that when executed cause the computing system to perform the steps.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

What is claimed is:

1. A method for determining a transformation in SE(3), a special Euclidean Group for 3 dimensions which represents a group of rigid transformations in 3D space and that can be represented by linear transformations on homogeneous four-vectors, the method comprising:
    receiving, by a host computing system, a video stream comprising a series of image frames and selecting a key image frame and a tracked image frame from the series of image frames;
    selecting a plurality of points on the key image frame;
    projecting the plurality of points onto the tracked image frame to produce a number of corresponding points on the tracked image frame;
    defining, for each corresponding point in the tracked image frame, an array of pixels centered on the corresponding point;
    for each corresponding point, reprojecting each pixel of the array thereof back onto the key image frame, wherein the reprojection of each said pixel of the array identifies a reprojected pixel in the key image frame;
    determining an intensity value for each reprojected pixel;
    parameterizing each array of pixels to determine, for each array of pixels, an outer product of the gradient vector for each array of pixels;
    determining a normal equation for each array of pixels; and
    solving the normal equation for SE(3).

2. The method of claim 1 wherein the step of selecting the plurality of points on the key image frame includes selecting the plurality of points according to a grid.

3. The method of claim 1 wherein the step of selecting the plurality of points on the key image frame includes employing a feature extraction method to select the plurality of points to correspond to features in the key image frame.

4. The method of claim 1 wherein the step of selecting the plurality of points on the key image frame further includes assigning random depth values to the points.

5. The method of claim 1 wherein the step of selecting the plurality of points on the key image frame further includes mapping depth values from a previous key frame.

6. The method of claim 1 wherein the step of selecting the plurality of points on the key image frame further includes extrapolating a depth value for a point from depth values of neighboring points.

7. The method of claim 1 wherein the step of projecting the plurality of points onto the tracked image frame includes rigidly transforming each point in SE(3) and then projecting a result onto the tracked image frame using a perspective matrix.

8. The method of claim 1 wherein the step of, for each corresponding point, reprojecting each pixel of the array back onto the key image frame includes finding the positions of the reprojected pixels in the key image frame.

9. The method of claim 8 wherein the step of, for each corresponding point, reprojecting each pixel of the array back onto the key image frame further includes finding the intensities of the reprojected pixels.

10. The method of claim 8 wherein finding the positions of the reprojected pixels in the key image frame includes reprojecting each pixel onto the key image frame using an homography.

11. The method of claim 1 wherein the step of solving the normal equation for SE(3) includes determining a patch intensity difference.

12. The method of claim 11 wherein the patch intensity difference is greater than a threshold and the method further includes
    defining, for each corresponding point in the tracked image frame, a second array of pixels centered on the corresponding point;
    for each corresponding point, reprojecting each pixel of the second array thereof back onto the key image frame, wherein the reprojection of each said pixel of the array identifies a reprojected pixel in the key image frame;
    determining a second normal equation for each second array of pixels; and solving the second normal equation for SE(3), wherein an intensity value for each
    reprojected pixel corresponding to the second array is not determined nor are each second array of pixels parameterized.

13. A system for determining a transformation in SE(3), a special Euclidean Group for 3 dimensions which represents a group of rigid transformations in 3D space and that can be represented by linear transformations on homogeneous four-vectors, the system comprising:
a host computer including
logic configured to receive a video stream comprising a series of image frames and selecting a key image frame and a tracked image frame from the series of image frames;
logic configured to select a plurality of points on the key image frame;
logic configured to project the plurality of points onto the tracked image frame to produce a number of corresponding points on the tracked image frame;
logic configured to define, for each corresponding point in the tracked image frame, an array of pixels centered on the corresponding point;
logic configured to, for each corresponding point, reproject each pixel of the array thereof back onto the key image frame, wherein the reprojection of each said pixel of the array identifies a reprojected pixel in the key image frame;
logic configured to determine an intensity value for each reprojected pixel;
logic configured to parameterize each array of pixels to determine, for each array of pixels, an outer product of the gradient vector for each array of pixels;
logic configured to determine a normal equation for each array of pixels; and logic configured to solve the normal equation for SE(3).

* * * * *